US011654981B2

(12) United States Patent
Behrens et al.

(10) Patent No.: US 11,654,981 B2
(45) Date of Patent: May 23, 2023

(54) AUXILIARY DOLLY

(71) Applicant: PREMIER COIL SOLUTIONS, INC., Waller, TX (US)

(72) Inventors: Randall Dean Behrens, Sealy, TX (US); Michael Bailey, Spring, TX (US)

(73) Assignee: PREMIER COIL SOLUTIONS, INC., Waller, TX (US)

( * ) Notice: Subject to any disclaimer, the term of this patent is extended or adjusted under 35 U.S.C. 154(b) by 414 days.

(21) Appl. No.: 16/292,904

(22) Filed: Mar. 5, 2019

(65) Prior Publication Data

US 2019/0270488 A1    Sep. 5, 2019

Related U.S. Application Data

(60) Provisional application No. 62/638,380, filed on Mar. 5, 2018.

(51) Int. Cl.
*B62D 53/04* (2006.01)
*B60D 1/42* (2006.01)
*B62D 59/04* (2006.01)

(52) U.S. Cl.
CPC .............. *B62D 53/04* (2013.01); *B60D 1/42* (2013.01); *B62D 59/04* (2013.01)

(58) Field of Classification Search
CPC ......... B60D 1/42; B62D 53/04; B62D 53/005
USPC ........................................... 280/405.1, 476.1
See application file for complete search history.

(56) References Cited

U.S. PATENT DOCUMENTS

| | | | | |
|---|---|---|---|---|
| 3,463,510 A | * | 8/1969 | Van Syoc | A01B 63/145 172/7 |
| 3,484,843 A | * | 12/1969 | Martin | E02F 3/64 37/417 |
| 3,670,822 A | * | 6/1972 | Reinhardt | B62D 53/068 172/7 |
| 3,685,853 A | | 8/1972 | Goldsmith | |
| 4,111,273 A | * | 9/1978 | Blackburn | B62D 49/007 180/14.1 |
| 4,226,437 A | * | 10/1980 | Trudeau | B60G 17/033 280/405.1 |
| 4,705,288 A | | 11/1987 | Schmidt | |
| 4,762,192 A | * | 8/1988 | Maxwell | B60P 3/40 180/14.2 |
| 5,328,197 A | * | 7/1994 | Karilainen | B62D 55/0655 280/405.1 |
| 5,348,331 A | | 9/1994 | Hawkins | |
| 5,363,924 A | * | 11/1994 | Foley | A01B 63/145 172/326 |
| 5,370,414 A | * | 12/1994 | Tucker | B62D 53/061 280/404 |
| 5,626,356 A | | 5/1997 | Harwood | |
| 6,290,248 B1 | | 9/2001 | Yrigoyen | |
| 8,215,657 B1 | * | 7/2012 | Gist | B62D 61/12 280/476.1 |

(Continued)

*Primary Examiner* — Tony H Winner
(74) *Attorney, Agent, or Firm* — Hunton Andrews Kurth LLP

(57) ABSTRACT

An auxiliary dolly attachable to the rear of a primary trailer includes a first portion attachable to the primary trailer, a second portion comprising one or more axles with wheels, and a pivot point at which the first portion is coupled to and movable relative to the second portion, and further includes one or more cylinders configured to adjust the first and second portions relative to each other and apportion weight between the primary trailer and the auxiliary dolly.

11 Claims, 2 Drawing Sheets

(56) References Cited

U.S. PATENT DOCUMENTS 9,126,644 B2 * 9/2015 Banwart ............ B62D 53/0864
2010/0038868 A1 2/2010 Zork et al.

\* cited by examiner

AUXILIARY DOLLY

CROSS-REFERENCE TO RELATED APPLICATIONS

This application claims priority to U.S. Provisional Patent Application No. 62/638,380 filed on Mar. 5, 2018, which is incorporated herein by reference in its entirety.

FIELD

Embodiments disclosed herein relate to coiled tubing equipment or any other heavy load equipment and the use of an auxiliary dolly and trailer to transport permanently mounted or removable equipment, which addresses the weight distribution and adjustment of the equipment to meet weight requirements to compensate for load distribution.

BACKGROUND

Coiled tubing equipment that is easily transported and serviceable is desirable. One solution is often the addition of an auxiliary dolly or "Booster" which attaches to the rear of the trailer. The booster typically has multiple axles and helps distribute the weight from the rear of the trailer in order to offset the over-axle weight of the coiled tubing injector. What is needed is an improved booster.

SUMMARY OF INVENTION

In one aspect, embodiments disclosed herein relate to an auxiliary dolly attachable to the rear of a primary trailer, the auxiliary dolly including a first portion attachable to the primary trailer, a second portion comprising one or more axles with wheels, and a pivot point at which the first portion is coupled to and movable relative to the second portion, and further including one or more cylinders configured to adjust the first and second portions relative to each other and apportion weight between the primary trailer and the auxiliary dolly.

In another aspect, embodiments disclosed herein relate to an auxiliary dolly attachable to the rear of a primary trailer, the auxiliary dolly including a first portion flexibly coupled to a second portion comprising one or more axles with wheels, wherein the first and second portions are flexible relative to each other, and wherein based on feedback that excess weight is being applied to either the primary trailer or the auxiliary dolly, the first and second portions are adjustable relative to each other to reapportion weight between the primary trailer and the auxiliary dolly.

In another aspect, embodiments disclosed herein relate to an auxiliary dolly attachable to the rear of a primary trailer, the auxiliary dolly including a first portion and a second portion flexible relative to each other, wherein the first and second portions are flexible relative to each other to reapportion weight between the primary trailer and the auxiliary dolly.

BRIEF DESCRIPTION OF THE DRAWINGS

The invention is illustrated in the accompanying drawings wherein.

DETAILED DESCRIPTION

Embodiments disclosed herein relate to heavy-hauling trucking, coiled tubing units, and transportation of large components with the assistance of an auxiliary dolly or the need for an auxiliary dolly. An auxiliary dolly or "Booster" attaches to the rear of a primary trailer in order to offset weight from the primary trailer by adding axles to distribute heavy loads over more axles. In addition, the booster uses a fulcrum on the front end which applies an upwards or downwards force on the rear of the primary trailer to transfer weight to another auxiliary dolly or "Jeep" if affixed, which is located in-between the powered tractor and the primary trailer, or distributes directly to the powered tractor. The booster works in combination with any type of powered system, including but not limited to hydraulic, electric, pneumatic, or mechanical systems, which either partly or wholly steers the booster in succession with the primary trailer in response to the movement or actions of the tractor operator.

A reverse mode of the booster activates sensors that will articulate the rear frame of the booster through hydraulic, electric, pneumatic, or a mechanical system to straighten itself during reverse operation allowing the operator to reverse the entire unit as long as desired which aides in maneuvering the unit.

The booster utilizes a pivot point for turning one portion of the booster either horizontally or vertically or a combination thereof, that has wheels and tires affixed to one axle, two axles or three axles or more.

The booster may include a safety mechanism comprised of an adjustable sensing valve or sensor in which evaluates weight transfer from the primary trailer, and relieves and bleeds off the pressure of the booster as not to overload the booster axles, mechanical properties, or constructed materials and other parts of the booster, and or how much weight is applied and transferred to either the tractor, primary trailer, jeep or any component attached to the convoyed unit.

The booster may include a hydraulically powered suspension system in which to consume and transfer load, with or without the assistance of a secondary method which may be pneumatic, electric, hydraulic, or by mechanical means.

The booster may include an attached hitch, either female or male, mounted to either a permanently mounted or telescoping length of metal to allow it to be affixed to an accompanied opposite styled attachment method on a tractor or another auxiliary dolly or jeep for alternative transportation of the booster.

The booster may use pressurized or sensing equipment to measure weight applied or transferred on the booster.

Figure 1:
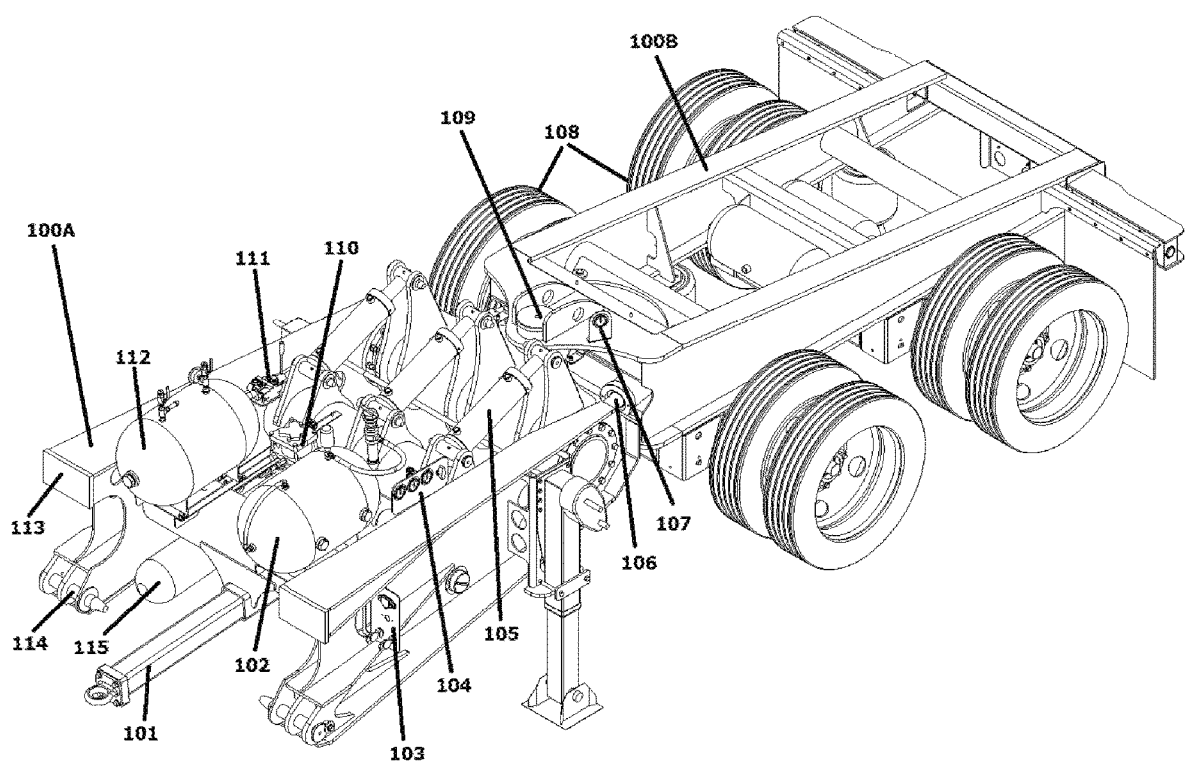
FIG. 1 illustrates an auxiliary dolly in accordance with one embodiment.

FIG. 1 illustrates one embodiment of a booster. The booster 100 is divided into two sections (first portion 100A and second portion 100B) with a pivot point 109 at which the first and second potions can move relative to each other.

Figure 3:
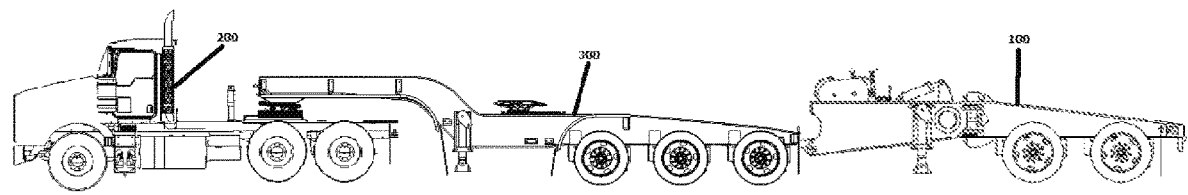
FIG. 3 illustrates the auxiliary dolly of FIG. 1 attached to the tractor via a primary trailer.

The first portion 100A of the booster may include a telescoping connection device 101 that allows it to be connected to a powered tractor with a corresponding mating connection, or a jeep 300 with a corresponding mating connection (FIG. 3). A hydraulic tank 102 provides hydraulic fluid for a bank of hydraulic cylinders 105 and steering cylinders 106. Power for the hydraulic loading cylinders 105 and steering cylinders 106 is made available through a 12V electrical connection on a bulkhead 103. The bulkhead 103 also has standard connections for emergency and tertiary braking systems, and electrical connections for signaling and braking lamps.

A booster monitoring panel 104 includes gauges to indicate system pressures, including dedicated gauges for piston side and rod side pressures for loading cylinders 105. The booster monitoring panel 104 also contains an activation valve which allows three methods of operation for the booster. A first method of operation allows the booster to run and operate as designed, i.e., apportioning or distributing weight between the primary trailer and the auxiliary dolly, a second method of operation allows it to completely "dump" the air and fluid from pneumatic and hydraulic systems, respectively, to allow detachment from the primary trailer, and finally a third method of operation allows it to lock the booster hydraulic system for alternate vehicle towing so that the booster remains level.

A valve (not shown) behind booster monitoring panel 104 is configured to cause the loading cylinders 105 to apply and adjust vertical forces, e.g., downward force or upward force, on the first portion 100A of the booster relative to the second portion 100B as the first portion 110A abuts against the primary trailer through flat surfaces 113. Another valve (not shown) below booster monitoring panel 104 is configured to set the rod side back pressure for loading cylinders 105 for cylinder stability, i.e., restricts further adjustments of loading cylinders 105 and holds the cylinder rods in place. The valve that adjusts the downforce applied by the loading cylinders 105 may also relieve excess pressure for overload protection on the hydraulic system and the interfacing mechanical surfaces. This may be used as failsafe for the system to prevent unit damage from high load fluctuations due to height differences between the primary trailer and the booster when traveling over uneven road conditions.

Air is provided by a 12V air pump 110, and override controls 111 are present to straighten the rear of the booster 100B if the need arises, or failure of the electrical system or connections 103. An accumulator 116 is present to aid in providing the hydraulic system instant pressure so that the cylinders react quickly and smoothly. Below the straightening valve 111 is a lockout valve for towing 112. The lockout valve 112 may be actuated during towing by tractor and towing by a jeep. The lockout valve 112 locks the steering to a straight travel only position.

The second portion 100B of the booster may have one, two, or three or more axles which apply weight by the use of standard industry suspension methods. This weight is distributed to and among the axles 108. The booster 100 may include standard air tanks (not shown) to store pneumatic pressure for use in the braking systems for axles 108. The second portion 100B further includes dual or paired hydraulic cylinders located on opposite sides to provide hydraulic pressure to steer the second portion 100B in either direction using pivot point 109 as a fulcrum to pivot from the first portion 100A.

Figure 2:
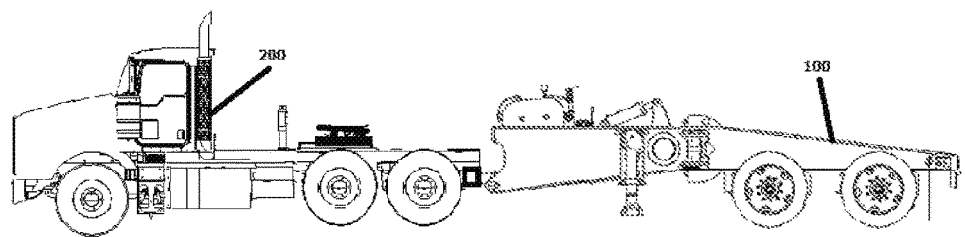
FIG. 2 illustrates the auxiliary dolly of FIG. 1 attached directly to a powered tractor without a primary trailer.

FIG. 2 illustrates the booster 100 attached to the powered tractor 200, using a pintle style male and female hooking system, or any other hooking system that will allow connection.

FIG. 3 illustrates the booster 100 attached to a jeep 300, using a pintle style male and female hooking system, or any other hooking system that will allow connection which is towed by a powered tractor 200.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. An auxiliary dolly attachable to the rear of a primary trailer, the auxiliary dolly comprising:
   a first portion attachable to the primary trailer, a second portion comprising one or more axles with wheels, and a pivot point at which the first portion is coupled to and movable relative to the second portion; and
   one or more cylinders configured to adjust the first and second portions relative to each other and apportion weight between the primary trailer and the auxiliary dolly wherein the one or more cylinders comprise loading cylinders configured to apply and adjust vertical forces to apportion weight; and
   a sensor that monitors weight being apportioned between the primary trailer and the auxiliary dolly, wherein upon sensing excess weight being applied to either the primary trailer or the auxiliary dolly, the sensor causes the one or more cylinders to adjust the first and second portions of the auxiliary dolly relative to each other and thereby reapportion weight between the primary trailer and the auxiliary dolly.

2. The auxiliary dolly of claim 1, wherein the one or more cylinders comprise loading cylinders configured to apply and adjust vertical forces on the first portion of the auxiliary dolly.

3. The auxiliary dolly of claim 1, wherein the one or more cylinders comprise steering cylinders configured to turn the first and second portions relative to each other.

4. The auxiliary dolly of claim 1, further comprising a connection device configured to couple the first portion of the auxiliary dolly to a powered tractor.

5. An auxiliary dolly attachable to the rear of a primary trailer, the auxiliary dolly comprising:
   a first portion flexibly coupled to a second portion comprising one or more axles with wheels,
   wherein the first and second portions are flexible relative to each other, and
   wherein based on a feedback that excess weight is being applied to either the primary trailer or the auxiliary dolly, the first and second portions are adjustable relative to each other to reapportion weight between the primary trailer and the auxiliary dolly; and
   a sensor that monitors weight being apportioned between the primary trailer and the auxiliary dolly, wherein upon sensing excess weight being applied to either the primary trailer or the auxiliary dolly, the sensor causes loading cylinders to adjust relative vertical forces between the first and second portions relative to each other and thereby reapportion weight between the primary trailer and the auxiliary dolly.

6. The auxiliary dolly of claim 5, wherein the loading cylinders are coupled between the first and second portions.

7. An auxiliary dolly attachable to the rear of a primary trailer, the auxiliary dolly comprising:
   a first portion attachable to the primary trailer, a second portion comprising one or more axles with wheels, and a pivot point at which the first portion is coupled to and movable relative to the second portion; and
   one or more cylinders configured to adjust the first and second portions relative to each other and apportion weight between the primary trailer and the auxiliary dolly wherein the one or more cylinders comprise loading cylinders configured to apply and adjust vertical forces to apportion weight; and a steering system configured to straighten the second portion relative to the first portion when the auxiliary dolly is moved in reverse.

8. The auxiliary dolly of claim 7, wherein the one or more cylinders comprise loading cylinders configured to apply and adjust vertical forces on the first portion of the auxiliary dolly.

9. The auxiliary dolly of claim 7, wherein the one or more cylinders comprise steering cylinders configured to turn the first and second portions relative to each other.

10. The auxiliary dolly of claim 7, further comprising a connection device configured to couple the first portion of the auxiliary dolly to a powered tractor.

11. An auxiliary dolly attachable to the rear of a primary trailer, the auxiliary dolly comprising:
   a first portion attachable to the primary trailer, a second portion comprising one or more axles with wheels, and a pivot point at which the first portion is coupled to and movable relative to the second portion; and
   one or more cylinders configured to adjust the first and second portions relative to each other and apportion weight between the primary trailer and the auxiliary dolly; and
   a sensor that monitors weight being apportioned between the primary trailer and the auxiliary dolly, wherein upon sensing excess weight being applied to either the primary trailer or the auxiliary dolly, the sensor causes the one or more cylinders to adjust the first and second portions of the auxiliary dolly relative to each other and thereby reapportion weight between the primary trailer and the auxiliary dolly;
   wherein the one or more cylinders comprise loading cylinders and steering cylinders.

* * * * *